United States Patent
Ballhorn

(10) Patent No.: US 6,598,230 B1
(45) Date of Patent: Jul. 22, 2003

(54) MULTIMEDIA BOX NETWORK

(76) Inventor: Karsten Ballhorn, Mehlbachstrasse 3b, Dalberg (DE), D-55595

( * ) Notice: Subject to any disclaimer, the term of this patent is extended or adjusted under 35 U.S.C. 154(b) by 0 days.

(21) Appl. No.: 09/257,377

(22) Filed: Feb. 25, 1999

(30) Foreign Application Priority Data

Aug. 21, 1998 (DE) .......................... 198 38 143
Oct. 15, 1998 (DE) .......................... 198 47 686

(51) Int. Cl.$^7$ .......................... H04N 7/173; G06F 15/16
(52) U.S. Cl. .......................... 725/118; 725/119; 725/98; 725/110; 709/217; 434/307 A
(58) Field of Search .......................... 725/98, 114–119, 725/110, 109, 111, 113, 122, 9–93; 709/217–219, 223–232; 434/307 A; 455/414, 420, 557, 3.01, 3.03, 3.06

(56) References Cited

U.S. PATENT DOCUMENTS

| | | | |
|---|---|---|---|
| 3,947,882 A | | 3/1976 | Lightner .................. 360/92 |
| 5,172,413 A | * | 12/1992 | Bradley et al. ............... 380/20 |
| 5,341,350 A | * | 8/1994 | Frank et al. ................. 369/30 |
| 5,355,302 A | | 10/1994 | Martin et al. ................ 364/410 |
| 5,418,713 A | | 5/1995 | Allen ....................... 364/403 |
| 5,583,937 A | * | 12/1996 | Ullrich et al. ................ 380/20 |
| 5,606,359 A | | 2/1997 | Youden et al. ............... 348/7 |
| 5,625,864 A | | 4/1997 | Budow et al. .............. 455/4.2 |
| 5,642,337 A | | 6/1997 | Oskay et al. ................ 369/30 |
| 5,724,355 A | * | 3/1998 | Bruno et al. ............... 370/401 |
| 5,761,602 A | * | 6/1998 | Wagner et al. ............. 455/3.1 |
| 5,794,116 A | | 8/1998 | Matsuda et al. ............. 455/5.1 |
| 5,805,804 A | * | 9/1998 | Laursen et al. ........ 395/200.02 |
| 5,808,224 A | * | 9/1998 | Kato ......................... 84/609 |
| 5,899,699 A | * | 5/1999 | Kamiya .................. 434/307 A |
| 6,018,337 A | * | 1/2000 | Peters et al. ................ 345/328 |
| 6,070,228 A | * | 5/2000 | Belknap et al. ............. 711/118 |
| 6,072,982 A | * | 6/2000 | Haddad ...................... 455/4.2 |
| 6,074,215 A | * | 6/2000 | Tsurumi ................. 434/307 A |
| 6,167,253 A | * | 12/2000 | Farris et al. ................ 455/412 |
| 6,173,406 B1 | * | 1/2001 | Wang et al. ................ 713/201 |
| 6,182,126 B1 | * | 1/2001 | Nathan et al. .............. 709/219 |
| 6,292,287 B1 | * | 9/2001 | Fujinoki .................... 359/212 |
| 6,308,204 B1 | * | 10/2001 | Nathan et al. .............. 709/221 |
| 6,514,083 B1 | * | 2/2003 | Kumar et al. ........... 434/307 A |
| 6,516,323 B1 | * | 2/2003 | Kamba .................... 707/104.1 |

FOREIGN PATENT DOCUMENTS

| | | |
|---|---|---|
| DE | 42 44 198 | 6/1994 |
| DE | 195 48 445 | 7/1997 |
| DE | 196 14 820 | 10/1997 |
| WO | 92/01342 | 1/1992 |

* cited by examiner

*Primary Examiner*—John Miller
*Assistant Examiner*—Annan Shang
(74) *Attorney, Agent, or Firm*—Patents & Tms, P.C.

(57) ABSTRACT

The invention relates to a multimedia box network consisting of a data server comprising a mass storage device, on which digital pieces of music and/or videos are stored, and of a plurality of multimedia boxes, with one multimedia box in each case comprising an operating unit, a local storage device and a player unit, and with each multimedia box being connected to the data server by means of a first data link. To provide a high-performance network for multimedia boxes, which allows a decentralised servicing of the multimedia boxes, it is provided that at least one management station comprising a computer is connected to the data server by means of a second data link and to at least one multimedia box by means of a third data link.

18 Claims, 3 Drawing Sheets

MULTIMEDIA BOX NETWORK

BACKGROUND OF THE INVENTION

1. Field of the Invention

The invention relates to a multimedia box network consisting of a data server comprising a mass storage means on which digital pieces of music and/or videos are stored and of a plurality of multimedia boxes, with each multimedia box comprising an operating apparatus, a local storage means and a player apparatus and with each multimedia box being connected to the data server by means of a first data link.

2. Description of the Related Art

Such a network is known, for example, from WO 92/01342. In accordance with WO 92/01342, a plurality of automatic jukeboxes are each linked to a central music storage means by means of a remote data transmission line, with said remote data transmission line preferably being an ISDN line. The automatic jukebox possesses in a known manner a coin acceptance device, a display, an input keypad and at least one loudspeaker and further possesses a digital to analog converter and amplifier for sound data recorded via the remote data transmission line.

From DE 42 44 198 A1, a network for a plurality of jukeboxes is known, said network having a decentralised structure. Here, no central storage device is provided for the pieces of music which can be played, but rather the pieces of music to be stored are distributed over a certain number of music player apparatus. The music player apparatuses are linked to one another in a network so that a piece of music can be requested from each music player unit to any other music player unit. A central computer additionally performs central management jobs, with, in particular, utilisation data of the individual music player apparatuses being stored on the central computer.

From U.S. Pat. No. 5,355,302, a network is known consisting of multiple jukeboxes, in which the individual jukeboxes are linked to a central management station in a star-shaped structure. The management station comprises a host computer and a mass storage device so that music data can be transmitted to the individual jukeboxes by the management station. In addition, the management station also takes over management jobs. For the servicing of the individual jukeboxes, a portable console is provided in each case which can be hooked up to the corresponding jukebox on site.

One disadvantage of the networks for jukeboxes described above is that either only central servicing by means of a central computer or, however, servicing on site for an individual jukebox is possible.

SUMMARY OF THE INVENTION.

It is therefore the object of this invention to provide a high-performance network for multimedia boxes which allows a decentralised servicing of a plurality of multimedia boxes.

This object is obtained with the present invention which includes at least one management station comprising a computer being linked by means of a second data link to the data server and by means of a third data link to at least one multimedia box, with pieces of music and/or videos being able to be transmitted from the data server to the multimedia box via the first data link, with data on the pieces of music and/or videos available on the data server being able to be transmitted via the second data link and with data for the servicing and/or programming of the individual jukeboxes being able to be transmitted from the management station connected thereto via the third data link. In accordance with the invention, a management station is therefore provided in each case for a certain group of a plurality of multimedia boxes, such management station allowing a decentralised servicing of said multimedia boxes. The management station does not here take over the job of transmitting large volumes of data, but merely regulates the exchange of information between the data server and the individual multimedia boxes while taking into account the range of pieces of music and/or videos provided in each case for a multimedia box.

With the multimedia box network in accordance with the invention, it is thus possible to service and manage a plurality of multimedia boxes in a decentralised manner by one operator or one operating company. The operating company can, in turn, forward the programme range for a multimedia box or the service for the maintenance of the multimedia box to the end user in each case. In this way, a decentralised system is provided for the operation of a plurality of multimedia boxes which are, in turn, linked to a data server in a cost-favourable manner.

In accordance with a preferred embodiment, the first data link between the data server and a multimedia box consists of an ISDN line.

In accordance with a preferred embodiment, it is provided that a service database of the pieces of music and/or videos available on the data server is stored on the management station, with said service database being able to be updated via the second data link. Even in the case of a large volume of data of stored pieces of music and/or videos on the data server, the compilation of the titles available in each case represents only a relatively low volume of data so that these can be stored without problem on the corresponding management stations in a database, too. As soon as certain services should be performed with a management station, first a connection is made to the central data server to update the service database of the corresponding management station. For this purpose, the data server transmits an add command to the management station for each new title to be added and a delete command for titles to be deleted.

To simplify the management of the pieces of music and/or videos available in each case on the data server, it can be provided that the data server consists of a main server and an information server. While the actual data of the pieces of music and/or videos are stored on the main server, the information server only manages the titles stored on the main server, in which way the main server is relieved. Appropriately, in this process all the data on the data programme of the main server is stored in an information database on the information server, with the exchange of data between the main server and the information server being made via a parallel data link. However, it is naturally also possible for the information server to be separated in space from the main server and for it to communicate with the main server via a suitable serial data link.

In accordance with another preferred embodiment, it is provided that a user database of the user data is stored on the management station, by means of which via the third data link a servicing and/or programming of the multimedia box connected in each case is possible. In this way, on the management station, the information on the multimedia box connected in each case is available directly without any additional data transmission being required for this purpose. In particular, the status of the multimedia boxes connected to the management station in each case can be stored on the user database. With the management station, it is thus possible to modify on the multimedia box in each case certain graphics and presentation forms of the titles stored equally as, for example, billing procedures towards the operator of the management station in each case.

In accordance with another preferred embodiment, it is provided that a command to record pieces of music and/or videos onto a certain multimedia box can be sent by the management station connected thereto to the data server via the second data link and/or via an additional link, with the recording of pieces of music and/or videos on the certain multimedia box being performed via the first data link. As a result, on the basis of the information database, the titles to be newly recorded for a multimedia box are compiled on the management station and a corresponding command generated from this for the data server. This command is then sent to the data server. To the extent that on the part of the data server there is a separation between an information server and a main server, the sending of the command is preferably made directly via an additional data link to the main server. The additional data link here preferably consists of an ISDN line in the direction of the data server and of an Internet connection in the opposite direction to the management station. Via the ISDN line, the command can be sent fast and directly to the data server or the main server, while, as a rule, it is not necessary to wait for confirmation from the data server or the main server that the command has actually been performed. For this reason, it is meaningful to send the command confirmation of the data server or the main server via the Internet where the corresponding message can be stored as an e-mail and downloaded from the management station at a suitable opportunity.

With regard to the design of the third data link between the management station and a multimedia box, two possibilities exist: on the one hand, a direct data link consisting of an ISDN line can be set up between the management station and the multimedia box in each case. On the other hand, however, it is also feasible that the already existing data links in accordance with the first data link and the second data link can be utilised, by these being connected in series in a suitable manner. For example, it is feasible to use the additional data link to the main server described above to connect this to the ISDN line between the main server and a multimedia box. For this purpose, the main server receives a corresponding connection call from the management station and switches this through to the corresponding ISDN line. In a corresponding way, it is naturally also possible to utilise the ISDN line described above between the management station and the information server. A switching on to the first data link consisting of an ISDN line between the main server and a multimedia box is then performed via the parallel data link between the information server and the main server.

The recording of corresponding music data on the data server is performed preferably by means of a CD playing apparatus. However, it should be noted here that the data format of the music data stored on a CD is not suitable for transmission in large volumes of data. It is therefore appropriate to convert the music data stored on a CD into a suitable format for transmission, with, for example, the MPEG format being suitable for pieces of music or music data and the JPEG format for images. As part of the transmission of images, in particular cover images can also be transmitted, with, when a piece of music is being played by the multimedia box, an associated cover image being displayed.

In accordance with a preferred embodiment, it is provided that the operating unit of a multimedia box consists of a touch-screen monitor on which the digital pieces of music and/or videos stored in the local memory can be displayed and selected by finger pressure and forwarded to a player apparatus. The player apparatus here consists in a normal manner of an amplifier/loudspeaker apparatus for the playing of the pieces of music and, where required, of a video monitor to display cover images or to present video images.

BRIEF DESCRIPTION OF THE DRAWINGS.

Further details and advantages of the invention are explained in more detail by means of an embodiment shown in the drawing, in which.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
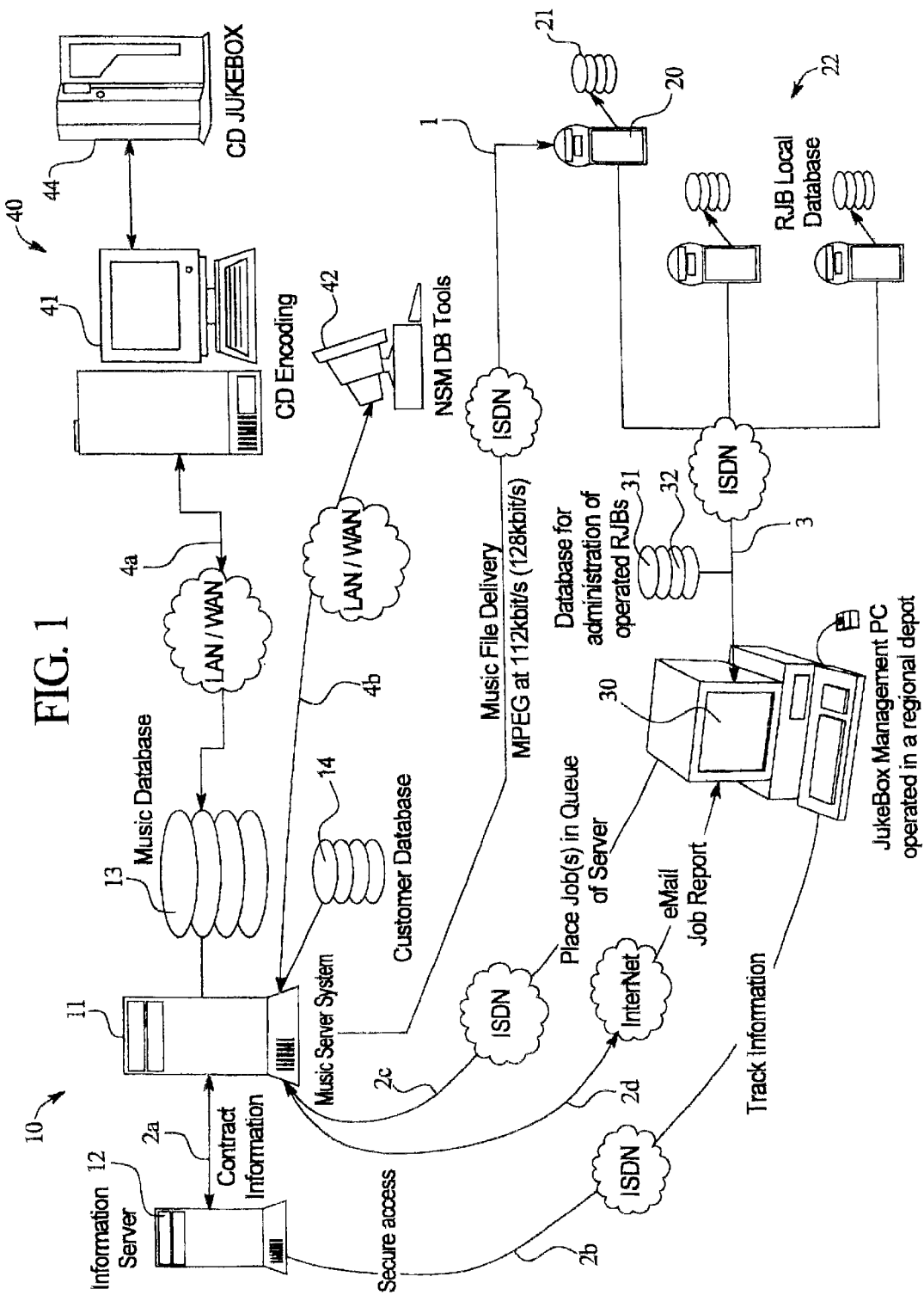
FIG. 1 shows the multimedia box network in accordance with the invention in operation in a first embodiment.

FIG. 1 shows the multimedia box network in accordance with the invention in a first embodiment.

The essential components of the multimedia box network are the data server 10, the multimedia boxes 20 connected thereto in a star-shaped structure, the management station 30 and a CD player unit 40. In the following, the network is described only for the transmission of music data, but the same also applies correspondingly to the transmission of other data in the multimedia area such as image data or video data. The data server 10 is, in turn, divided into a main server 11 and an information server 12, which communicate with each other via a data link 2a. On the main server 11, all music data and/or image data are stored in a database 13, while data concerning billing and licensing are stored in a user database 14. On the information server 12, in contrast, all access data of the pieces of music available on the main server are stored. To record digital music data on the database 13, a CD encoding system 41 with a CD changer 44 is provided. The CD encoding system converts the CD data format into a suitable transmission format, for example an MPEG format, so that the converted data can be transmitted to the music database 13 via a LAN/WAN data line 4a. To manage the user database 11, in the CD player unit an additional operating unit 42 is provided which is connected to the main server 11 via the LAN/WAN data line 4b.

As a rule, only a data server 10 consisting of a main server and an information server 12 is required, with, for example, up to 10,000 pieces of music being able to be stored in MPEG format in the music database 13. Then, the individual jukeboxes are connected in a star-shaped structure to the main server 10 via an ISDN line, with, for reasons of simplification, in FIG. 1 only one ISDN line 1 to one jukebox 20 being shown. A certain number of jukeboxes is operated and serviced by one operating company in each case so that these jukeboxes represent one operator group 22. Each operator group 22 has a management station 30 allocated to it, which is linked in each case via an ISDN line 3 in a star-shaped structure to the individual jukeboxes 20 of one operator group 22. The management station 30 comprises a user database 31, on which the status of the connected jukeboxes 20 is managed. On the side of the management station 30, it is possible to modify on the jukebox 20 presentation types equally as certain billing procedures.

In addition to the user database 31, the management station also comprises a service database 32 on which the pieces of music available on the data server are managed. To update the service database 32, the management station 30 is linked to the information server 12 with an ISDN line 2b. In addition, there is in the direction of the main server 11 an ISDN link 2c and, in the opposite direction from the main server 11 to the management station 30 an Internet connection 2d.

In the operation of the network in accordance with FIG. 1, a difference must essentially be made between the recording of new music data on the main server 11, the recording of new music data on the jukeboxes 20 and the playing of pieces of music by the corresponding jukebox 20.

The recording of new music data on the music server is performed via the CD player apparatus 40 via the LAN/WAN line 4a to the music database 13. The music data are transmitted in the MPEG 1 layer 3 format so that per minute of playing time around 1 megabyte of memory is required. For the individual pieces of music, the licensing over the operating company of an operating group 22 is monitored in each case in the user database 14. A piece of music can, for example, be licensed for one year so that after the year new license fees are incurred if the piece of music is still requested from the operating company.

The recording of new pieces of music to one music box 20 in each case is performed at the instigation of the operating company in the management station 30 in each case. The logging in on the part of the management station 30 on the data server 10 is performed in a first step via the ISDN line 2b over the information server 12. After the log-in, the information server 12 transmits two command groups to update the service database 32, namely an "add command" and a "delete command". The add command comprises a list of all music titles which were recorded by the CD player unit 40 after the last log-in. In contrast, the delete command contains a list of the music titles deleted from the music database 13 since the last log-in. After the log-in, the service database 32 thus represents a mirror image of the data on the music database 13 on the information server 12.

After the up-dating of the service database 32 has been concluded, new music titles can be selected from the data programme by the operator which are to be newly recorded on a certain jukebox 20 of the operator group 22. After the selection of the titles, a corresponding command is sent to the main server 11 via the ISDN line 2c. No further steps are required on the management station 30 so that the management station 30 can generally be switched out of the network after the sending of the command in question. The command received by the corresponding management station 30 is queued into a list of commands to be processed by the main server and processed at the appropriate time. For this purpose, the main server 11 makes a data link to the corresponding jukebox 20 via the ISDN line 1 and plays the selected music titles from the music database 13 into the local database 21 of the jukebox 20. Once all music titles have been played over completely, the successful processing of the command is confirmed to the corresponding management station 30 via the Internet link 2d. The confirmation message is sent as an e-mail here and can be downloaded from the management station 30 at a convenient time.

Figure 2:
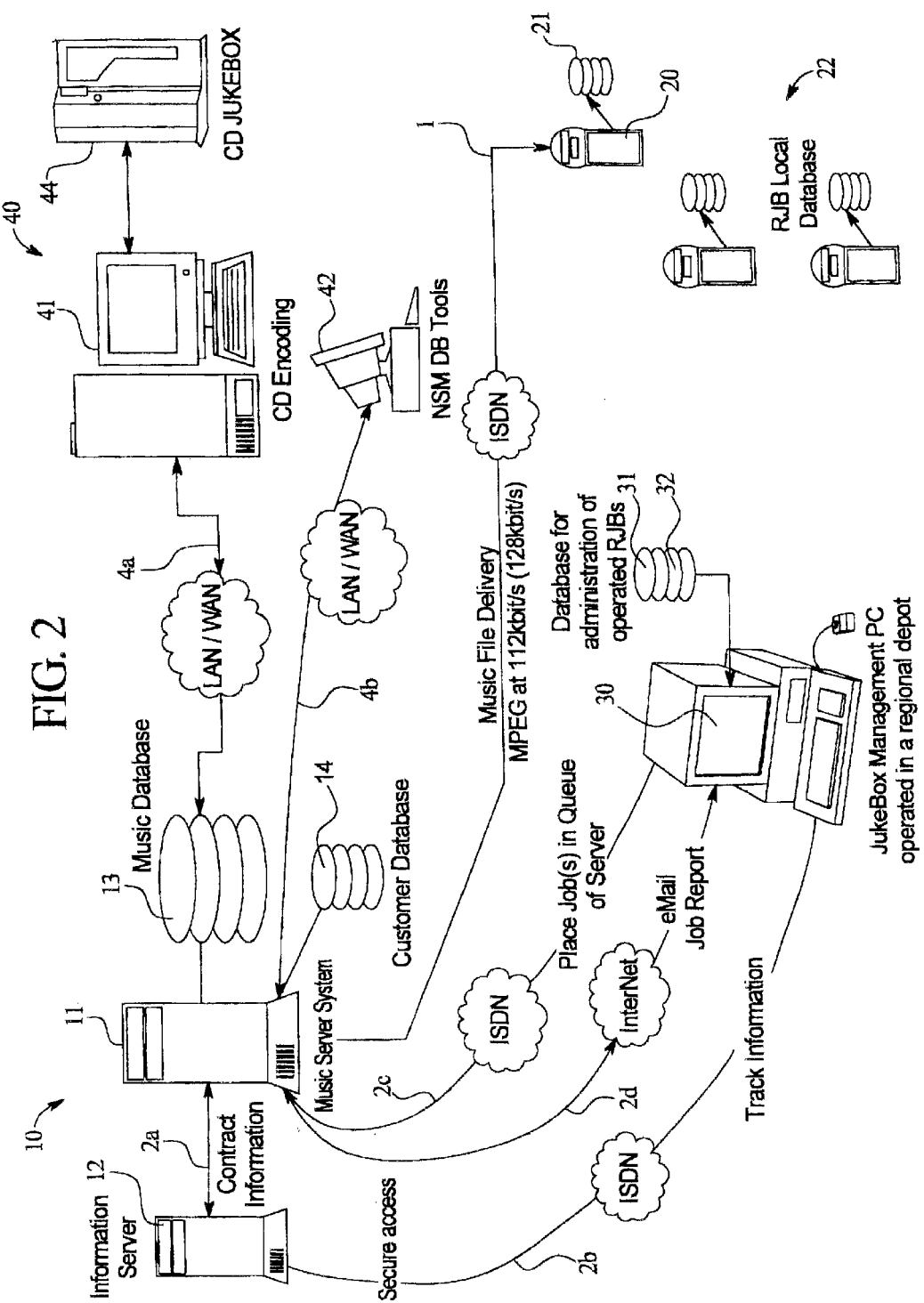
FIG. 2 shows the multimedia box network in accordance with the invention in operation in a second embodiment.

FIG. 2 shows the multimedia box network in accordance with the invention in operation in a second embodiment.

The multimedia network of FIG. 2 differs from the network of FIG. 1 in that the third data link between the jukebox (20) in each case and the management station (30) does not consist of a direct ISDN link (3), but of an ISDN link led through the data server. Here, the already existing data links 2b or 2c and 2a and 1 are connected in series in such a way that a data link can be made between the jukebox in question and the management station.

Figure 3:
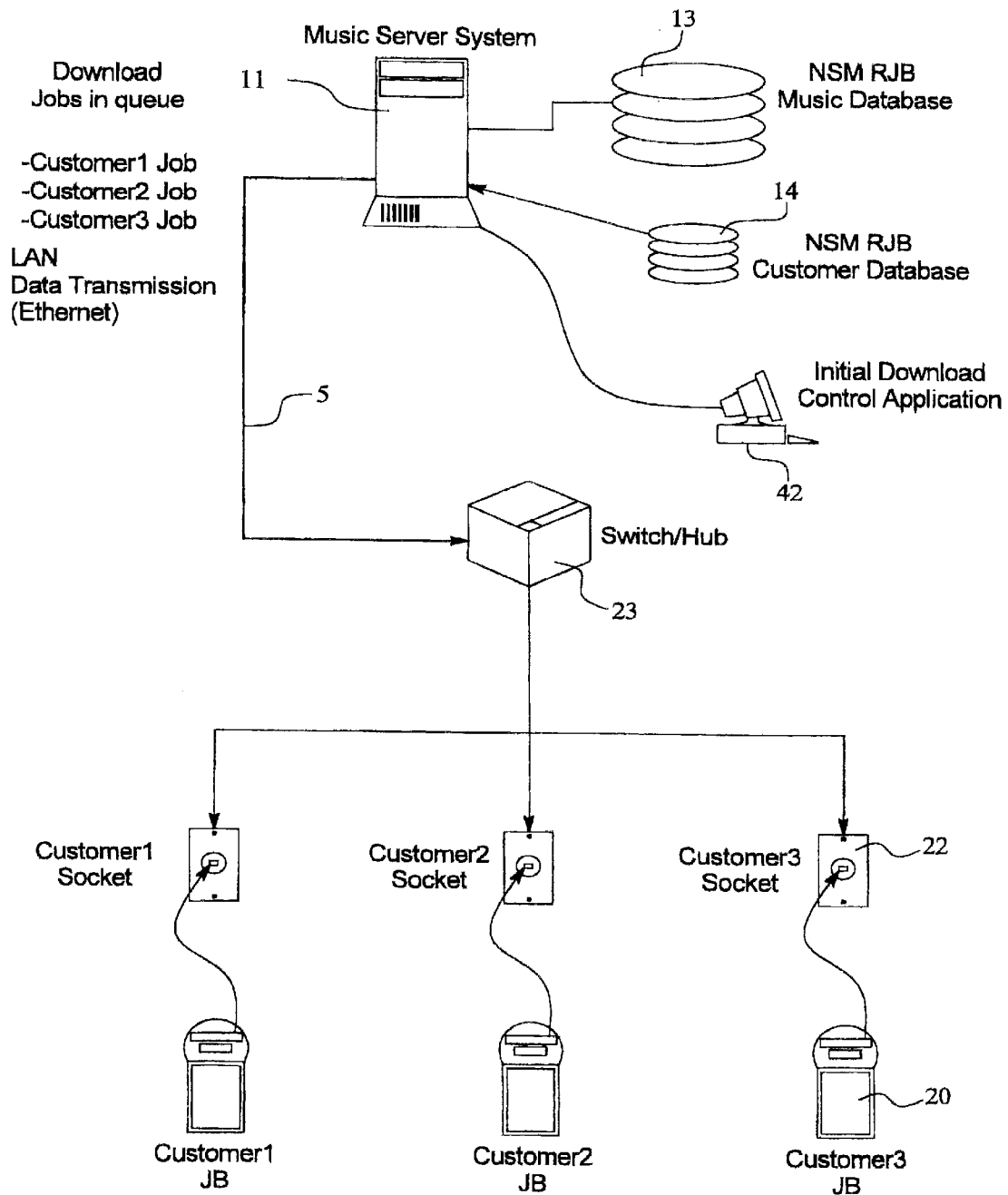
FIG. 3 shows the initialisation of individual multimedia boxes prior to their being put into operation.

FIG. 3 shows the initialisation of individual jukeboxes prior to their being put into operation.

A jukebox 20 is as a rule supplied with an empty local database 21 so that prior to its being put into operation the corresponding jukebox has to be initialised.

On the one hand, the initialisation of a jukebox can be performed after its installation on site so that then in accordance with FIG. 1 corresponding music data can be played over with an initialisation program available on the main server 11 via the ISDN line 1. One disadvantage of this initialisation consists, however, of relatively high transmission costs being incurred through the ISDN line, as on the first recording of the local database 21 large volumes of data have to be transmitted.

Another possibility of initialisation therefore consists of the configuration of FIG. 2 where the jukeboxes 20 to be initialised are located in proximity to the main server 11 so that the corresponding data can be played over via a local network link 5. In this way, data links with a transmission rate of some megabits per second can be made, while via the conventional ISDN line between the main server 11 and a jukebox 20 of FIG. 1, transmission rates of only 128 Kbit per second can be achieved. After the jukeboxes 20 have been initialised accordingly, they can be supplied to the relevant operator, with the operator only having to connect the jukebox to a conventional ISDN phone socket at the installation location.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A multimedia box network comprising:
   a main data server including a mass storage device on which digital pieces of music and/or videos are stored;
   an operator group including at least one multimedia box linked to said main data server by a first data link over which pieces of music and/or videos are transmitted, said at least one multimedia box including an operating unit, a local storage device and a player apparatus;
   a peripheral management station connected to said main data server by a second data link over which said peripheral management station can receive data on the pieces of music and/or videos available on said main data server, said peripheral management station including a computer connected to said operator group by a third data link over which data for servicing and/or programming of said at least one multimedia box can be transferred from said peripheral management station.

2. The multimedia box network as set forth in claim 1, wherein said peripheral management station is remotely located from said operator group, and said third data link includes a direct ISDN line.

3. The multimedia box network as set forth in claim 1, wherein said third data link is connected in series with said first data link and said second data link.

4. The multimedia box network as set forth in claim 1, wherein said first data link includes an ISDN line.

5. The multimedia box network as set forth in claim 1, wherein said peripheral management station includes a service database for storing information on the pieces of music and/or videos available on said main data server, which stored information can be updated over said second data link.

6. The multimedia box network as set forth in claim 5, wherein said stored information is updated over said second data link using an add command and a delete command.

7. The multimedia box network as set forth in claim 1, wherein said main data server includes a separate information server storing information on a data program contained within said main data server, data between said main data server and said information server being exchanged via a parallel data link.

8. The multimedia box network as set forth in claim 1, wherein said operator group includes a plurality of multimedia boxes, said peripheral management station transferring data for servicing and/or programming of each of said plurality of multimedia boxes over said third data link.

9. The multimedia box network as set forth in claim 2, wherein said operator group includes a plurality of multimedia boxes, said peripheral management station transferring data for servicing and/or programming of each of said plurality of multimedia boxes over said third data link.

10. The multimedia box network as set forth in claim 5, wherein said peripheral data station provides said operator group with said data on the pieces of music and/or videos available on the main data server over said third data link, but said pieces of music and/or videos themselves are delivered to said operator group from said main data server over said first data link.

11. The multimedia box network as set forth in claim 1, further comprising a plurality of operator groups each including at least one multimedia box, each of said plurality of operator groups connected to a respective one of a plurality of peripheral management stations for decentralized servicing of said multimedia boxes through said respective peripheral management stations.

12. The multimedia box network as set forth in claim 1, wherein a command from said peripheral management station to play over specified pieces of music and/or videos onto said multimedia box connected thereto is sent to said main data server via said second data link, with actual playing over of said specified pieces of music and/or videos to said multimedia box being done via said first data link.

13. The multimedia box network as set forth in claim 12, wherein said second data link includes an ISDN line in a direction toward said main data server and an Internet connection in a direction toward said peripheral management station.

14. The multimedia box network as set forth in claim 9, wherein said peripheral management station includes a user database storing a status of each of said plurality of multimedia boxes connected to said peripheral management station.

15. The multimedia box network as set forth in claim 1, wherein said operating unit includes a touch-screen monitor for displaying identifying information on digital pieces of music and/or video stored in said local storage device, said touch-screen monitor allowing selection of a piece of music and/or video for forwarding to said player apparatus.

16. A multimedia box network comprising:
- a main data server including a mass storage device on which digital pieces of music and/or videos are stored;
- an operator group including at least one multimedia box remotely linked to said main data server by a first data link over which pieces of music and/or videos are transmitted, said at least one multimedia box including an operating unit, a local storage device and a player apparatus;
- a peripheral management station connected to said main data server by a second data link, separate from said first data link, over which said peripheral management station can receive data on the pieces of music and/or videos available on said main data server, said peripheral management station remotely located from said main data server and from said operator group and including a computer connected to said operator group by a third data link, separate from said first and second data links, over which data for servicing and/or programming of said at least one multimedia box can be transferred from said remotely located peripheral management station.

17. The multimedia box network as set forth in claim 16, further comprising a plurality of operator groups each including at least one multimedia box, each of said plurality of operator groups connected to a respective one of a plurality of peripheral management stations for decentralized servicing of said multimedia boxes through said respective peripheral management stations.

18. The multimedia box network as set forth in claim 16, wherein said operator group includes a plurality of multimedia boxes serviced by said peripheral management station, said peripheral management station being operated in a regional depot.

* * * * *